United States Patent [19]

Harris et al.

[11] Patent Number: 5,265,760
[45] Date of Patent: Nov. 30, 1993

[54] INDIVIDUAL FILM PACKET DISPENSER AND TRAY DISPENSER

[75] Inventors: Clark E. Harris, Fairport; David E. Foeller, Batavia; Thomas A. Maurer; Robert P. Provencher, both of Rochester, all of N.Y.

[73] Assignee: Eastman Kodak Company, Rochester, N.Y.

[21] Appl. No.: 893,186

[22] Filed: Jun. 3, 1992

[51] Int. Cl.⁵ .................................... B65H 1/00
[52] U.S. Cl. .................. 221/197; 221/257; 221/271; 221/287
[58] Field of Search .......... 221/91, 85, 271, 276, 221/270, 197, 287, 255, 256, 257, 232; 312/60, 61, 184, 214

[56] References Cited

U.S. PATENT DOCUMENTS

| | | | |
|---|---|---|---|
| 949,223 | 2/1910 | Dunning | 221/197 |
| 1,723,232 | 8/1929 | Fischer et al. | 221/197 |
| 1,973,867 | 9/1934 | Cook | 221/276 |
| 2,247,834 | 7/1941 | Davis, Jr. et al. | 221/276 |
| 2,282,036 | 5/1942 | Cobbs et al. | 221/255 |
| 2,286,010 | 6/1942 | Rabkin | 206/455 |
| 2,434,785 | 1/1948 | Blumenstein | 221/276 |
| 2,626,197 | 1/1953 | Kollock | 221/197 |
| 2,707,066 | 4/1955 | Stegeman | 221/268 |
| 3,161,320 | 12/1964 | Swanson | 221/255 |
| 3,168,965 | 2/1965 | Rinn | 221/197 |
| 3,224,822 | 12/1965 | Kirby | 221/276 |
| 3,351,233 | 11/1967 | Chanoch et al. | 221/276 |
| 3,412,895 | 11/1968 | Hilton | 221/268 |
| 4,032,485 | 8/1977 | Tippetts | 221/312 R |
| 4,108,308 | 8/1978 | Franke et al. | 378/185 |
| 4,767,022 | 8/1988 | Oldorf | 221/92 |
| 4,771,179 | 9/1988 | Ijiri | 250/515.1 |
| 4,791,657 | 12/1988 | Kirsch et al. | 378/169 |
| 4,795,654 | 1/1989 | Teleki | 250/515.1 |
| 4,805,201 | 2/1989 | Strong-Grainger | 378/169 |
| 4,831,643 | 5/1989 | Tanaka | 378/169 |
| 4,912,740 | 3/1990 | Liese, Jr. | 378/169 |
| 4,922,511 | 5/1990 | Gay | 378/169 |
| 4,951,305 | 8/1990 | Moore et al. | 378/147 |
| 5,077,779 | 12/1991 | Steinhausen, Jr. | 378/168 |

FOREIGN PATENT DOCUMENTS

87/03402  6/1987  PCT Int'l Appl. ............... 221/268

Primary Examiner—Robert P. Olszewski
Assistant Examiner—Kenneth Noland
Attorney, Agent, or Firm—Frank Pincelli

[57] ABSTRACT

A tray and dispenser for holding and dispensing individual film packets from a stack of film packets provided in a tray. The tray comprises a bottom wall, an first end wall, a second end wall, and two substantially parallel side walls. The side and end walls extend upwardly from the bottom wall and terminate in an upper rim to define an open top and a recess for receiving a stack of film packets. The second end wall is provided with a support surface for supporting a stack of film packets placed in the recess when the tray is placed in the vertical position. The bottom wall of the tray is provided with ribs for spacing the stack of film packets a predetermined distance from the surface of the bottom wall and forming a rear space behind the bottom packet. The second end wall is also provided with an access opening for allowing access to the packet disposed on the bottom of the stack of film packets when the tray is placed in the substantial vertical position. The dispenser comprises a shell support structure which forms an internal chamber for receiving at least the lower portion of the tray and holding the tray in a substantially vertical position. A stripping member is provided for removing in seriatim the film packets from the recess in the tray. The stripper includes a stripper member having a configuration for insertion into the access opening in the bottom end wall and the rear space of the tray for removing the bottom packet.

26 Claims, 9 Drawing Sheets

INDIVIDUAL FILM PACKET DISPENSER AND TRAY DISPENSER

FIELD OF THE INVENTION

The present invention relates to a dispenser for dispensing individual film packets in seriatim from a stack of packets placed in a tray, and a tray for holding a stack of film packets and dispensing individual packets from the tray.

BACKGROUND OF THE INVENTION

In the practice of dentistry, it is often necessary to obtain dental x-ray pictures. For this purpose, dental x-ray film is typically provided in a packet designed for placement within the mouth of a patient. Unlike some flat articles that are dispensed, these packets are soft and easily deformed. Additionally these packets typically have a thin outer rim which adds to the difficulty in dispensing of the packets. Examples of such dental packets are illustrated in U.S. Pat. Nos. 4,108,308; 4,831,463; 4,771,179; 4,791,467 and 4,951,305. These dental film packets are typically provided in banded bundles containing 150 packets. The bundles are placed into a dispenser and the band removed. This procedure is quite cumbersome and often results in packets being dropped. Additionally, out of necessity, this loading process requires handling of the packets by the user. Furthermore, the soft nature of the packets make it difficult to dispense the packets individually from a dispenser. Dispensers of the prior art often experience jamming of the film packet at the time of dispensing. As a result of the foregoing problems, user of prior art devices have simply placed the banded bundle of dental x-ray film packets in a drawer from which individual packets are then removed. However, this too presents certain undesirable problems. For example, as each individual packet is removed from the bundle, the bundle becomes looser until the packets are free to simply move within the drawer. This can result in damage or contamination of the film packets.

Applicants have invented a dispenser for dispensing, in a sanitary manner, individual packets from a stack of packets which is easy to fill, minimizes or eliminates potential contact by the user during filling of the dispenser, requires little or no maintenance and provides reliable dispensing of the packets. The dispenser of the present invention is also designed to provide dispensing of individual packets directly into a cup or other similar container held under the dispensing area of the dispenser.

Applicants have also invented an improved tray for holding and dispensing individual film packets in a clean and sanitary manner. The tray may be placed within a drawer or other confining area for individual dispensing of the packets.

SUMMARY OF THE INVENTION

In one aspect of the present invention there is provided a tray for holding and dispensing individual film packets from a stack of film packets provided in the tray. The tray comprises a bottom wall, an upper end wall, a lower end wall, and two substantially parallel side walls. The side and end walls extend upwardly from the bottom wall and terminate in an upper rim portion to define an open top and a recess for receiving a stack of film packets. The lower end wall is provided with an access opening for allowing access to the packets disposed in the recess.

In another aspect of the present invention there is provided a tray for holding a stack of film packets and for use with a dispenser for dispensing individual packets in seriatim from the tray. The tray comprises a bottom wall, an upper end wall, a lower end wall, and two substantially parallel side walls. The side and end walls extend upwardly from the bottom wall and terminate in an upper rim portion to define an open top and a recess for receiving a stack of film packets. The bottom wall is provided with means for forming a rear space behind the bottom packet. Means are also provided for allowing access to the rear space.

In yet another aspect of the present invention, there is provided a tray containing a stack of film packets for holding and dispensing individual film packets from the stack of film packets. The tray comprises a bottom wall, an upper end wall, a lower end wall and two substantially parallel side walls. The side and end walls extend upwardly from the bottom wall terminating in an upper rim portion to define an open top and a recess for receiving a stack of film packets. The lower end wall is provided with an access opening for allowing access to the packets placed in the recess. A cover is placed over the upper rim for completely enclosing the packets within the recess.

In accordance with still another aspect of the present invention, there is provided a dispenser for dispensing individual film packets in seriatim from a stack of packets provided in a tray. The tray comprises a bottom wall, an upper end wall, a lower end wall and two substantially parallel side walls. The side and end walls extend upwardly from the bottom wall and terminate in an upper rim to define and an open top and a recess for receiving a stack of film packets. The lower end wall is provided with a supporting surface for supporting the stack of film packets when the tray is disposed in the substantially vertical position. The bottom wall is provided with means for forming a rear space behind the bottom packet of the stack of film packets. Means are also provided for allowing access to the rear space behind the bottom packet of the stack of film packets. The dispenser comprises a shell support structure having means to receive and retain the tray in a substantially vertical position and stripping means for removing in seriatim the film packets from the recess of the tray.

BRIEF DESCRIPTION OF THE DRAWINGS

In the detailed description of the preferred embodiment presented below, reference is made to the accompanying drawings, in which.

DETAILED DESCRIPTION OF THE PREFERRED EMBODIMENT

Figure 1:
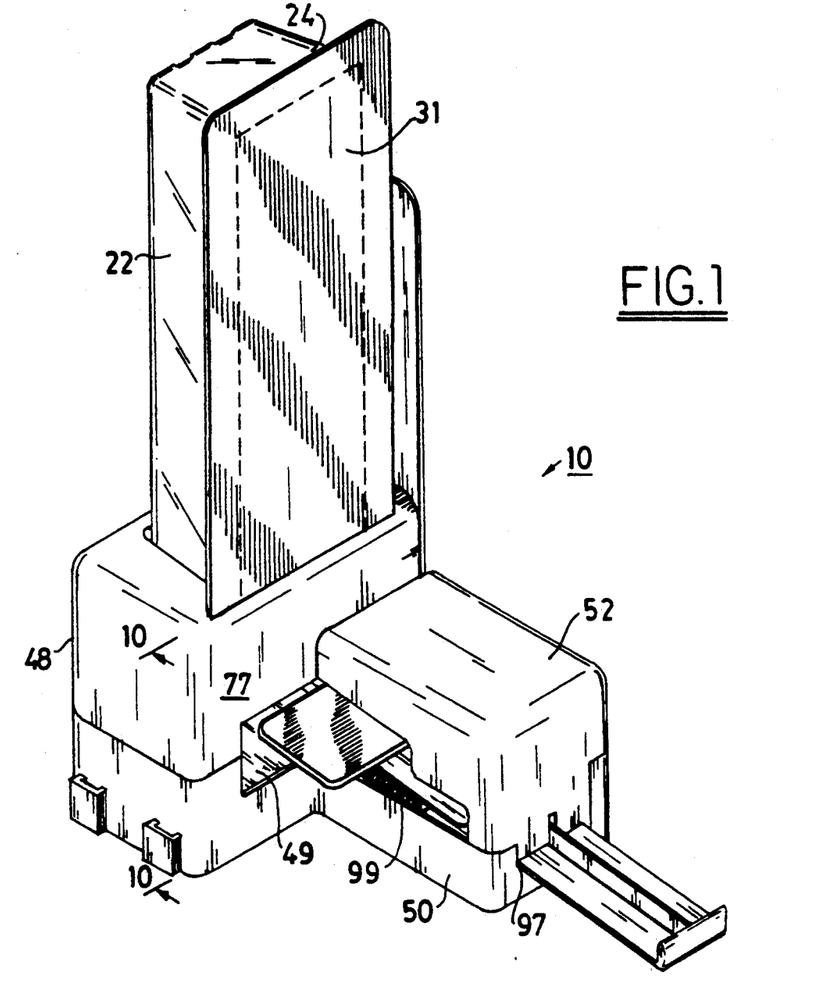
FIG. 1 is a perspective view of a dispenser and tray containing a stack of film packets made in accordance with the present invention.
Figure 7:
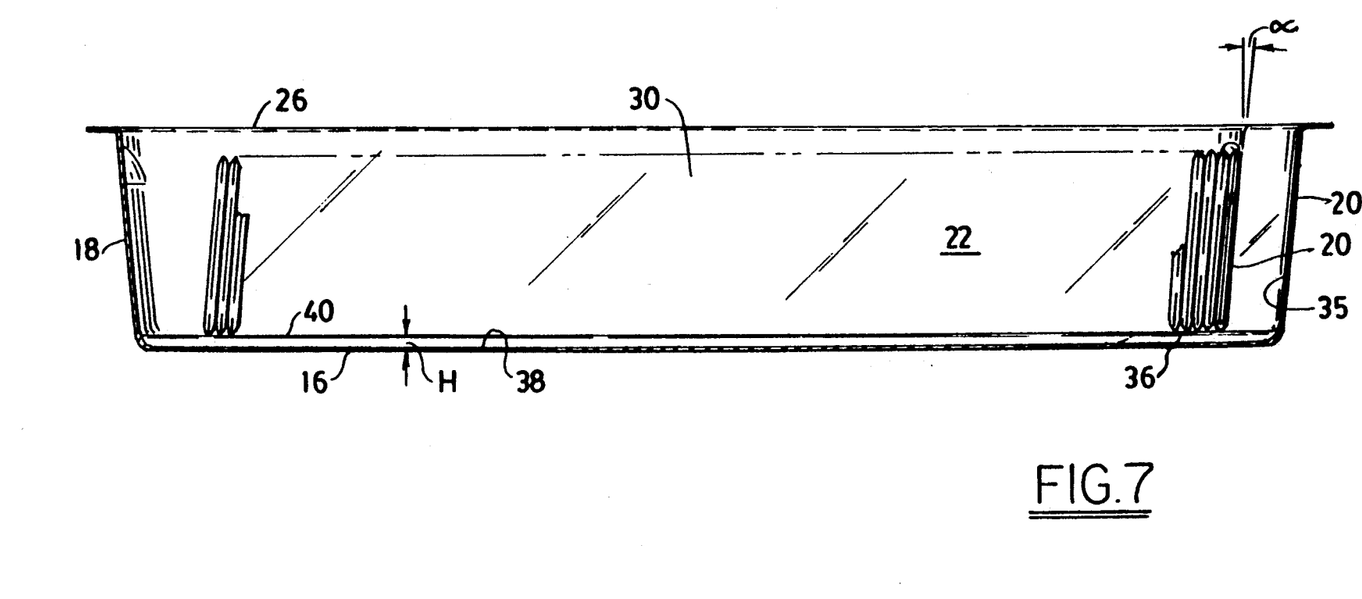
FIG. 7 is a cross section view of the tray of FIG. 5 as taken along line 7—7 illustrating the tray when filled with a full stack of packets and the peelable cover placed in sealing position on the tray.

Referring to the figures, there is illustrated a dispenser 10 designed to hold a dispensing tray 12 containing a stack of film packets 14. In the particular embodiment illustrated, the film packets comprise x-ray film designed for use as is commonly used in the art. The tray comprises a bottom wall 16, an upper end wall 18, a lower end wall 20 which is substantially parallel to the upper end wall and a pair of substantially parallel side walls 22,24. The end walls 18,20 and side walls 22,24 merge at their juncture and extend from the bottom wall 16 terminating in an upper rim 26 to define an open top 28 and a recess 30 for receiving the stack of film packets 14. In the particular embodiment illustrated, rim 26 has a substantially planar sealing surface 27. The sidewalls 22,24 are spaced apart such that a single stack of film packets will be held in position, one above the other, when the tray is placed in the vertical position (as illustrated in FIG. 1) and also allows the remaining packets to easily slide down as each successive bottom film packet is removed from the tray 12. A peelable cover 31 is place over the open top 28 and is secured to the sealing surface 27 of rim 26 by an appropriate adhesive so as to seal and completely enclose the stack of film packets 14 in the recess 30. Preferably tray 12 is made of a plastic material which can be molded as a single unitary piece. In the particular embodiment illustrated, tray 12 is made of poly(ethylene terephalate) and is thermo-formed. The lower end wall 20 of tray 12 is provided with a pair of spaced support surfaces 32 which define an access opening 34 having a length L and a width W. The access opening 34 extends from the rim 26 to the bottom wall 16. The supporting surfaces 32 are designed to support the bottom packet of the stack of film packets 14. The support surfaces 32 are preferably disposed at a small angle α with respect to a plane perpendicular to the bottom wall 16 (see FIG. 7). In the particular embodiment illustrated angle α is 5 degrees. This small angle orientation assists in reducing the manufacturing cost of the tray 12. The access opening 34 is of a size which allows entry to access opening 32 either by the finger of a user or by other means for removing the bottom packet as is later discussed herein. In the particular embodiment illustrated the length L is about ¾ of an inch (1.905 cms) and the width W is about ⅜ of an inch (0.925 cms). The bottom section 35 of lower end wall 20, which forms part of access opening 34, is also inclined in a similar manner as support surfaces 32.

Means are also provided on the bottom wall 16 for spacing the back edges 36 of the film packets 14 from the surface 38 of the bottom wall 16. In the particular embodiment illustrated, this is accomplished by providing the bottom wall 16 with a pair of spaced ribs 40 which are raised with respect to the bottom surface 38. The ribs 40 define a substantially central opening 41 which extends along the longitudinal length of the bottom wall 16 and form a rear space 42 behind the bottom packet. The ribs have a height so as to provide rear space 42 with a predetermined height H. In the particular embodiment illustrated, the ribs 40 provide a height H of about ⅛ of an inch (0.3175 cms). The lower ends of the ribs 40 are flared out such that the width of the rear space 42 is substantially equal to the width of the access opening 34 at the point where they meet. The rear space 42 and access opening 34 allows access to the back edge 36 of the bottom packet 14.

The support surfaces 32 and adjacent sidewalls 22, 24 merge together so as to form corners 46 each having a configuration such that it does not interfere with the side edges of the bottom packet. This allows the bottom packet to be easily removed from the recess 30 without restriction. Preferably as illustrated the corners 46 have a radius R such that the corners 46 extends below the surface of the adjacent support surfaces 32 so as to form supporting projections 47 disposed on both sides of access opening 34. In the particular embodiment illustrated radius R is about ¼ of an inch (0.635 cms).

The dispenser 10 includes a shell support structure 48 which forms an internal chamber 49. In the particular embodiment illustrated shell support structure comprises a base 50 and a removable top 52 which combine to form the internal chamber 49. Preferably the base 50 and top 52 are made of a moldable material such as plastic for ease and low cost manufacture. In the embodiment illustrated base 50 and top 52 are made of a copolyester-polycarbonate material. However, the base 50 and top 52 may be made of any appropriate material. The base 50 and top 52 are shaped such that the internal chamber 49 comprises a rear section 56 for holding tray 12 in a substantially vertical orientation and a forward dispensing section 58 for allowing the dispensing of the packets in seriatim from the tray 12. The base 50 includes a bottom wall 64 having a pair of upwardly extending spaced projections 65, 67 for supporting the lower portion of the tray 12 in a substantially vertical position. In the particular embodiment illustrated, the projections are positioned so that the upper end of projections 65, 67 is disposed at the forward corner areas of the lower end walls to provide a stable support surface. A rear projection 69 extends upwardly from the bottom wall 64 and is provided for assisting in maintaining the tray 12 in the substantially vertical position. Projection 69 is positioned such that it is adjacent the bottom wall 16 of the tray 12 when the tray 12 is placed in the dispenser 10. The bottom wall 64 of base 50 is preferably inclined at an angle β with respect to a plane which is perpendicular to the bottom wall 16 of the tray 12 when the tray 12 is mounted in the dispenser 10 in the substantially vertical position (see FIGS. 6A–6C). As is discussed in greater detail later herein, orienting the bottom wall 64 in this manner assists in the removal of the bottom packet.

Figure 10:
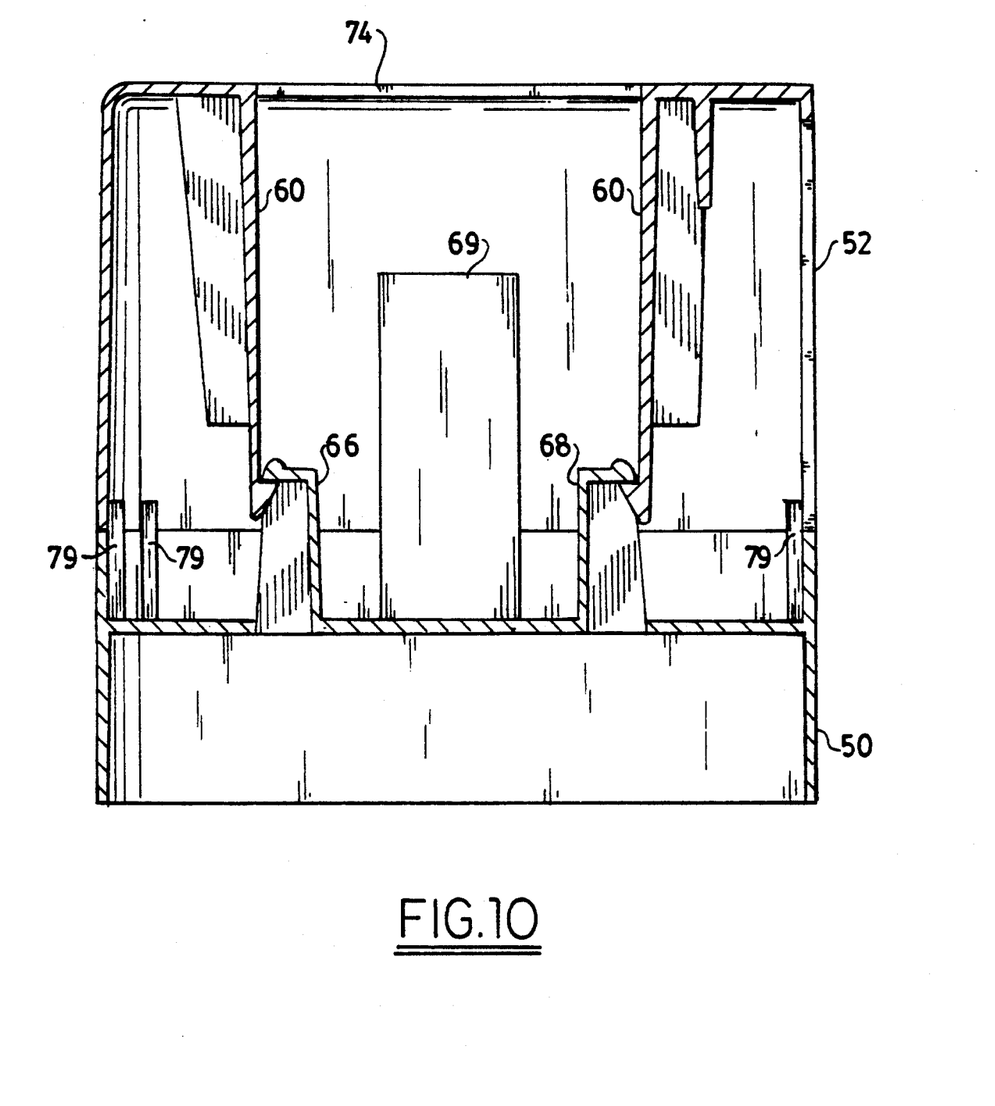
FIG. 10 is a cross sectional view of the dispenser of FIG. 2 as taken along line 10—10.

The top 52 may be removably mounted to base 50 in any desired manner. In the particular embodiment illustrated, the top 52 is secured to base 50 by a pair of downward extending latch members 60 which lock into openings 62 provided in projections 66, 68 which extends upwardly from the bottom wall 64, as best seen by reference to FIG. 10. A plurality of aligning pins 79 are also provided on base 50 which mate against the inside wall of top 52. An opening 74 is provided in top 52 for receiving tray 12. The opening 74 has a configuration which corresponds generally to the outer cross sectional configuration of the tray 12. The opening 74 is located in the rear section 56 such that when the lower portion of the tray 12 is placed through the opening 74 into the dispenser 10. The opening 74 and projections 65, 67 and 69 work together to hold the tray 12 securely in the substantially vertical position as illustrated in FIG. 1. The opening 74 has a pair of narrow sections 75 designed to receive the generally planar rim 26 and is also located so that the rim 26 will be adjacent the front wall 77 of top 52. The positioning of rim 26 adjacent front wall 77 assists in maintaining the tray 12 in the substantially vertical position, maintaining the packets 14 in the tray 12 and dispensing only the bottom packet as is discussed later herein.

The forward dispensing section 58 of the dispenser is provided with means for removing the film packets 14 from tray 12 in seriatim. In the particular embodiment illustrated, the means for removing the film packets comprises a stripper mechanism 82 having a dispensing member 84. In the particular embodiment illustrated, dispensing member 84 is made of a plastic material. However, the dispensing member 84 my be made of any appropriate material. A clip 86 is disposed at one end of the dispensing member 84 for insertion into access opening 34 in the bottom of lower end wall 20 of the tray 12. The clip 86 comprises a support surface 87 for supporting a single packet and dispensing the packet from the dispenser 10. The support surface 87 is shaped such that a packet 14 will remain thereon when removed from the dispenser or will fall off in a predetermined direction. In the particular embodiment illustrated, the surface has a generally rectangular shape having a length L1 of about ⅜ inches (0.9525 cms) and a width W1 of about ¾ inches (1.905 cms) so as to accommodate a film packet having size of 1¼ inches by 1¾ inches (3.175 by 4.445 cms). The particular size and shape of support surface 87 may be varied to accommodate any size or shape film packet. Clip 86 is provided with a generally planar retaining finger 88 at its forward terminal end 90 for placement behind the back edge 36 of the bottom packet 14. The retaining finger 88 has a configuration such that only the bottom packet will be captured between the retaining finger 88 and clip 86. In the particular embodiment illustrated, the retaining finger 88 is disposed at an angle γ of about 45° with respect to the top surface of the clip 86 and extends a distance such that the terminal end 91 of the retaining finger 88 is spaced a distance H2 above the surface 87 of clip 86. It is to be understood that the retaining finger 88 may be modified so as to accommodate any size or type film packet. The dispensing member 84 further includes an arm 92 having one end connected to the rear end of clip 86. In the preferred embodiment illustrated, the arm 92 is displaced a distance D1 below the top surface of the clip 86 so as not to interfere with the stack of film packets and the dispensing of the film packet on support surface 87. The distance D1 is preferably of about ¼ of an inch (0.636 cms) or greater. In the particular embodiment illustrated, the distance D1 is approximately ¼ inches (0.635 cms). Dispensing member 84 further includes a gripping section 94 located at the rear of arm 92 which is slideably mounted to the base 50 by a pair of spaced parallel channels 96 formed in the bottom wall 64 of base 50 which are designed to receive and retain the side edges 95 of the gripping section 94. It is to be understood that the dispensing member 84 may be slideably mounted to the dispenser in any desired manner. Channels 96 are disposed such that the dispenser member 84 moves in a direction substantially perpendicular to the tray 12 so as to allow the clip 86 to pass through access opening 34 and go into the rear space 42 behind the bottom packet and allow dispensing of the bottom packet from the tray 12. The hand gripping section 94 extends through an appropriately placed and sized opening 97 provided in dispenser 10 between the top 52 and base 50.

A dispensing opening 99 of an appropriate size and shape is provided in dispenser 10 for allowing dispensing of the bottom packet after it has been removed from the tray 12 by dispensing member 84. The dispensing and rear sections 56, 58 have a configuration such that opening 99 allows dispensing of the bottom packet on one side of dispensing section 58 as illustrated in FIG. 1. The opening 99 in front wall 77 is positioned such the only the bottom packet of the stack may pass therethrough. The packets above the bottom packet are prevented from any forward movement by front wall 77.

Figure 6A:
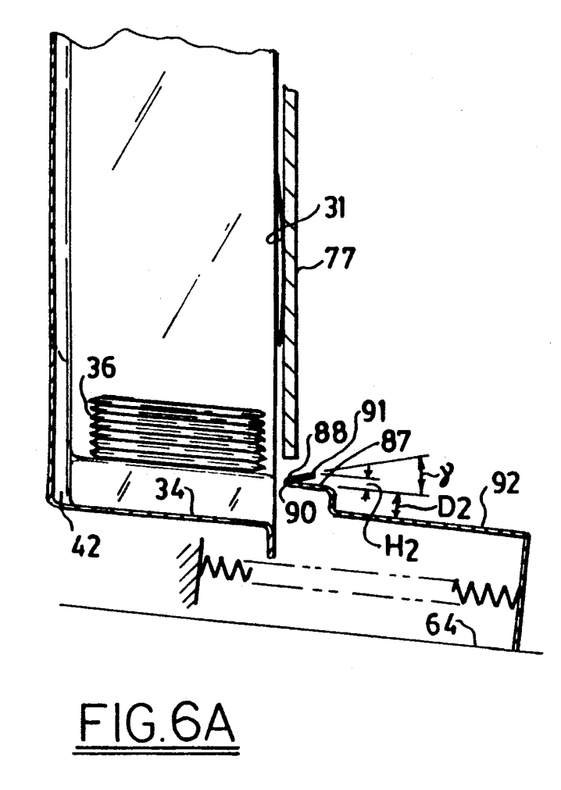
FIG. 6A is an partial enlarged cross sectional view of the dispenser as taken along lines 6—6 of FIG. 4 illustrating the dispensing member in the dispensing position.

A return spring 98 is provided so as to maintain the dispensing member 84 at a predetermined position. In the particular embodiment illustrated, spring 98 is designed to bias the clip 86 in the dispensing position as illustrated in FIG. 6A. The return spring 98 has one end 100 secured to the base 50 and a second end 102 secured to the dispensing member 84 at any convenient location so that the clip 86 and retaining finger 88 are normally positioned in front of the bottom packet as shown in FIG. 6A. In the particular embodiment illustrated spring 98 is illustrated as a compression spring. However, a tension spring or any desired means may be provided to bias the dispensing member at the desired position. While the spring 98 is desirable for biasing the dispensing member 84 at a predetermined position, if desired, the spring 98 may be omitted leaving the operator to move dispensing member 84.

A back plate 104 is secured to the base 50 and top 52 and is designed to engage a mounting plate 106. The mounting plate 106 is designed to be mounted to a wall or other fixture. In the particular embodiment illustrated the mounting plate 106 is provided with a pair of vertically spaced openings 108 designed to receive mounting projections (not shown) provided on back plate 104. The dispenser 10 is mounted to the mounting plate 106 by simply moving the dispenser in a downward direction so as to lock the dispenser thereon. In order to remove the dispenser, the dispenser is simply lifted upward and then removed from the mounting plate 96.

Figure 8:
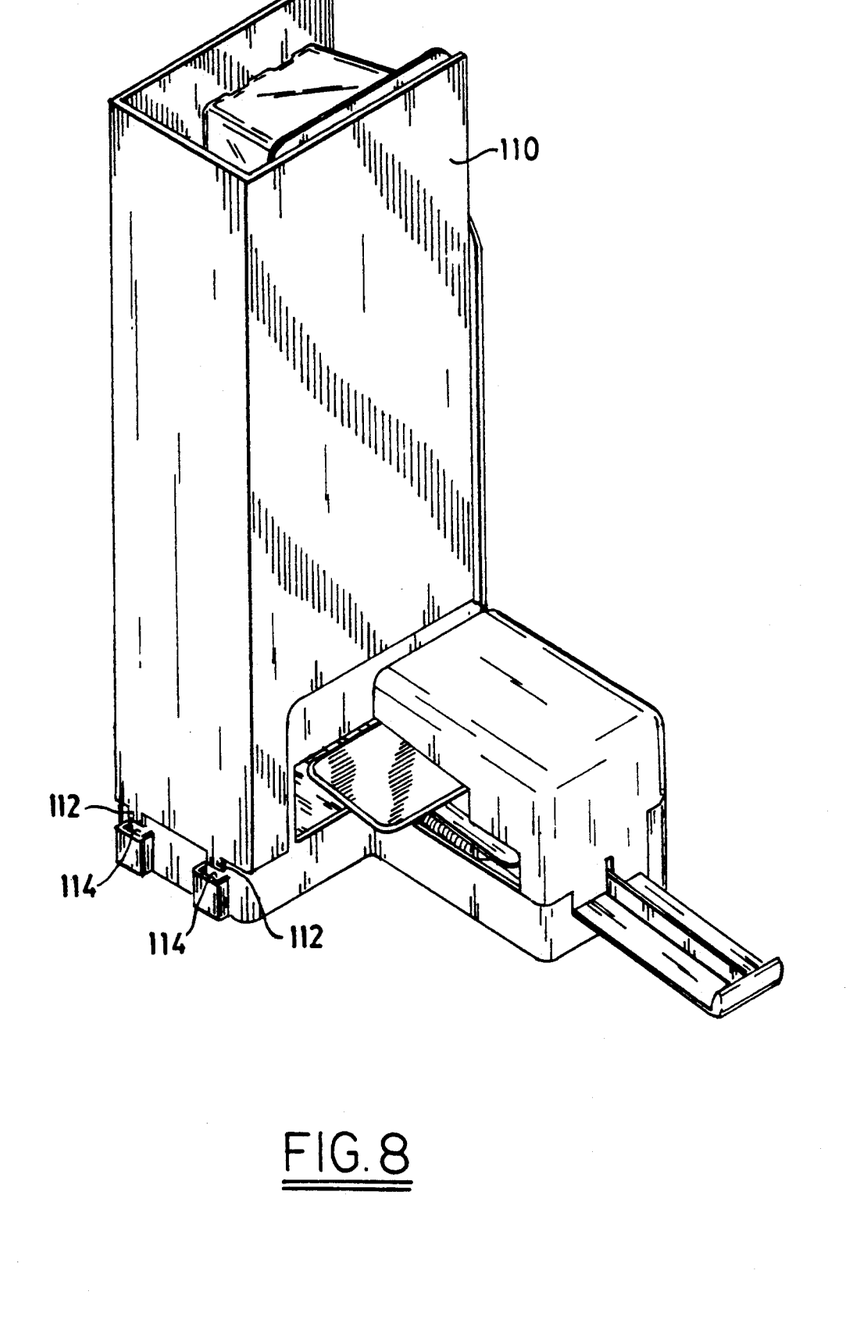
FIG. 8 is a perspective view of the dispenser and tray of FIG. 1 illustrating an optional shield placed thereon.

Referring to FIG. 8, there is illustrated an optional shield 110 designed to be placed on the dispenser 10 such that the packets 14 within the tray 12 are protected from stray x-ray radiation. In the particular embodiment illustrated, the shield 110 is secured to the base 50 by a plurality of projections 112 provided on the shield which mate into corresponding slot or openings 114 provided on the outer surface of the peripheral wall of base 50. However, the shield 110 may be secured to the dispenser 10 in any desired manner.

Figure 2:
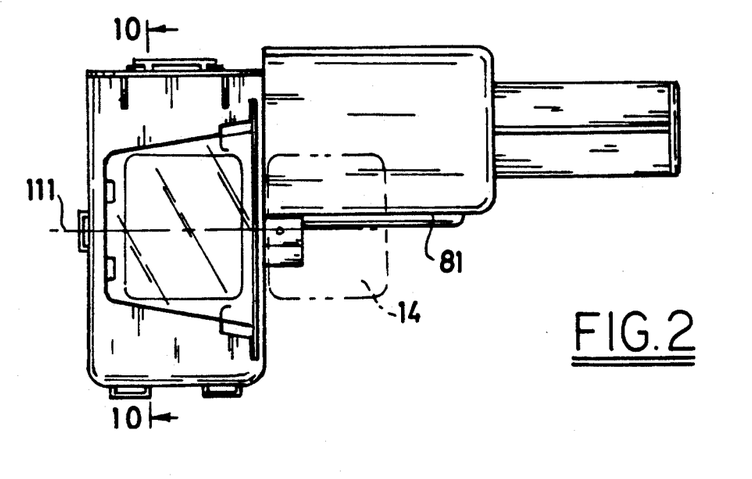
FIG. 2 is a top plan view of the dispenser and tray of FIG. 1.
Figure 3:
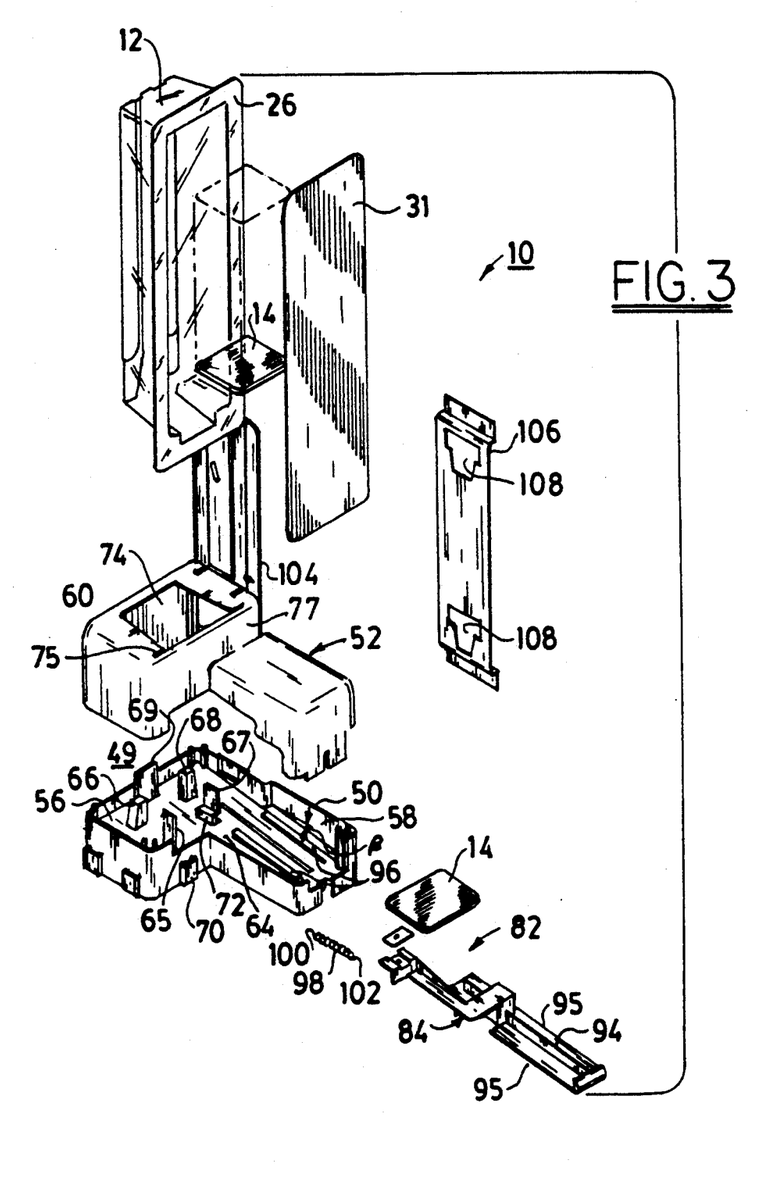
FIG. 3 is an exploded perspective view of the dispenser and tray of FIG. 1.
Figure 4:
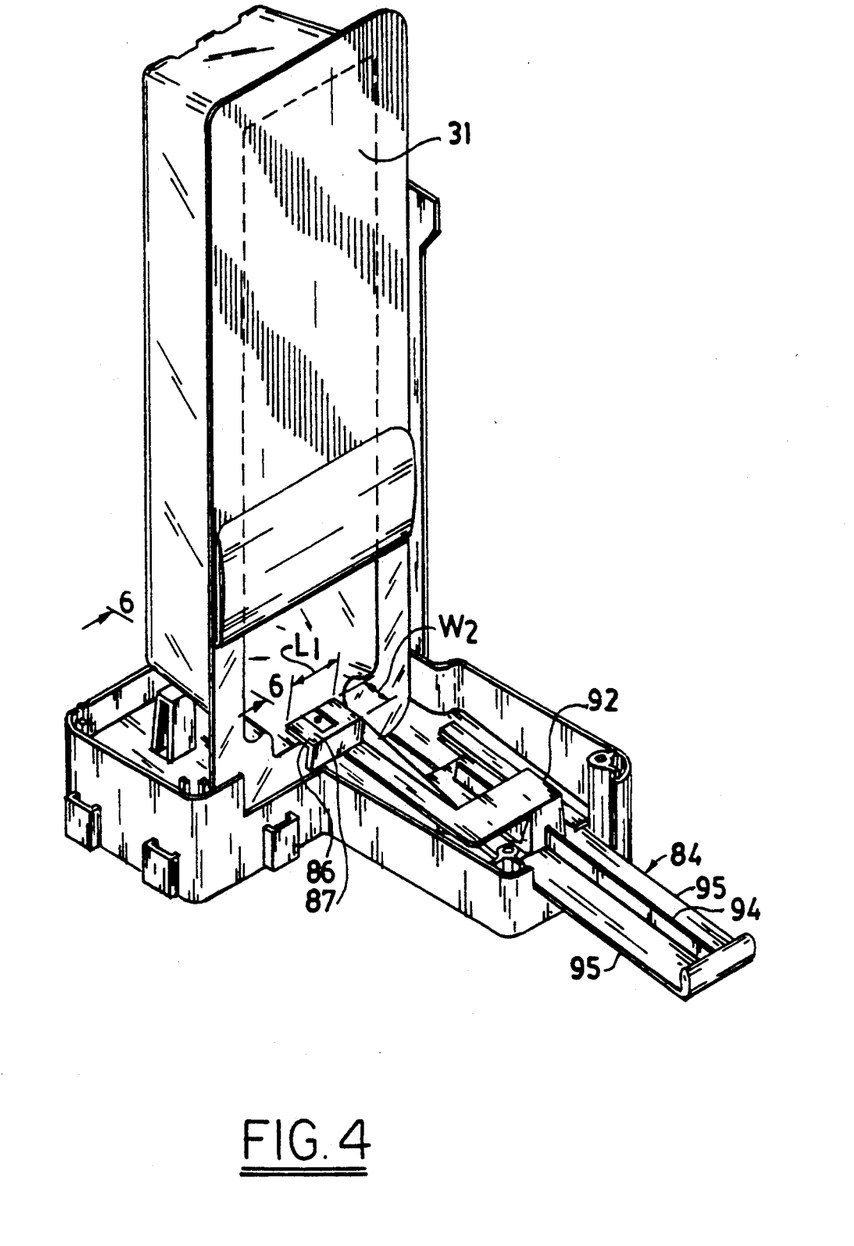
FIG. 4 is a perspective view of the dispenser and tray of FIG. 1 with the top of the dispenser removed.
Figure 5:
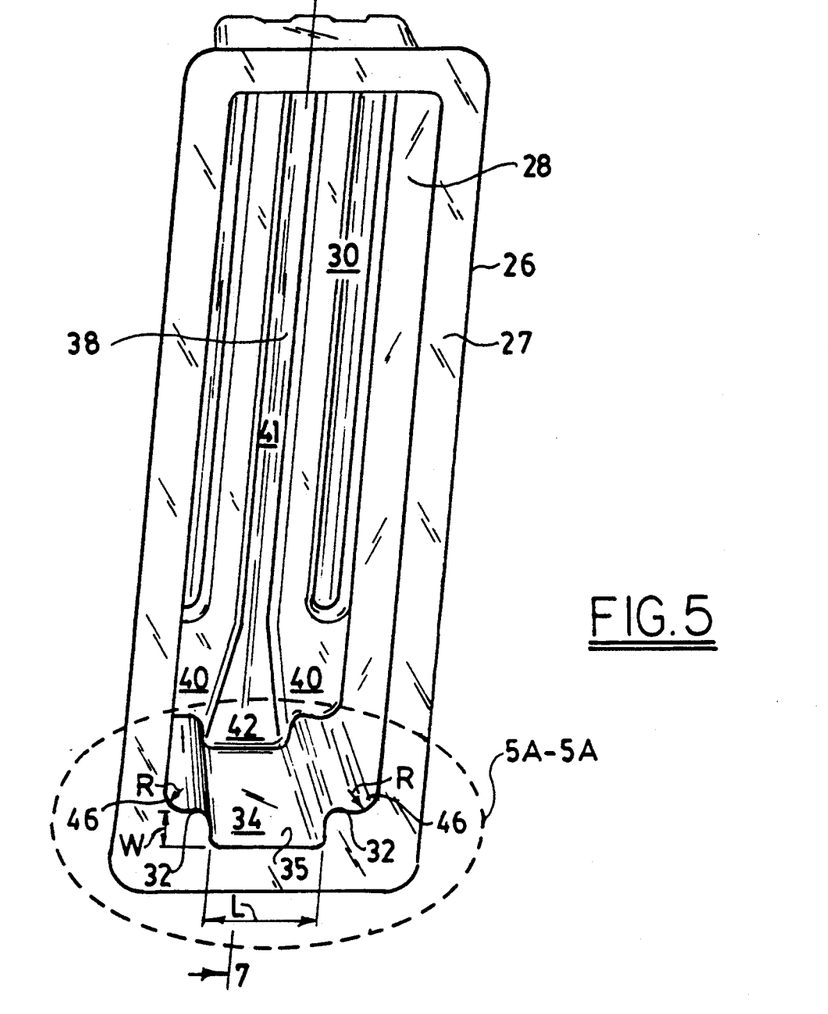
FIG. 5 is a perspective view of the tray of FIG. 1 with the peelable cover and the stack of film packets removed.
Figure 5A:
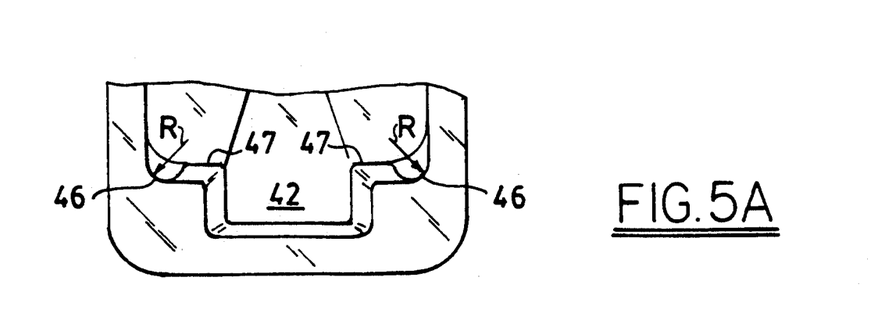
FIG. 5A is an enlarged partial elevational view of the tray of FIG. 5 as taken along line 5A—5A.

In order to more clearly understand the present invention, a detailed discussion of its operation will now be discussed. Initially, a tray 12 having a stack of film packets 14 is provided. The packets in the particular embodiment illustrated are dental x-ray film packets designed to be used in the mouth of a patient. The peelable cover 31 adjacent the lower end wall is peeled back a sufficient distance so as to expose at least the bottom packet. Typically, the cover would first be peeled off so as to expose about 5 to 10 packets in the lower portion of the tray 12. The cover 31 should not be peeled back too far back so as to expose the packets above the front wall 77 when the tray is positioned within the dispenser 10. The tray 12 with the exposed packets 14 is then placed through opening 74 into the dispenser 10 and properly seated, as illustrated in FIG. 2. In order to dispense an individual packet, the stripper member is pushed forward so as to cause the clip 84 to engage the bottom packet from the stack of packets and allow removal of the bottom packet out of opening 99 and dispensing of the packet to the user.

Figure 6B:
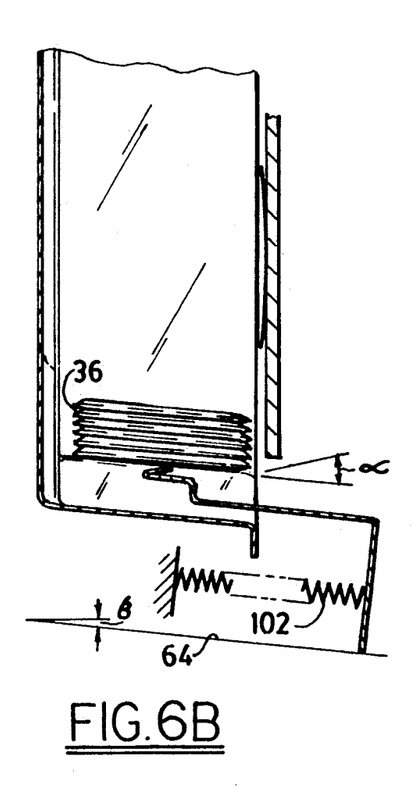
FIG. 6B is a view similar to FIG. 6A illustrating movement of the dispensing member from the dispensing position toward the engaging position.
Figure 6C:
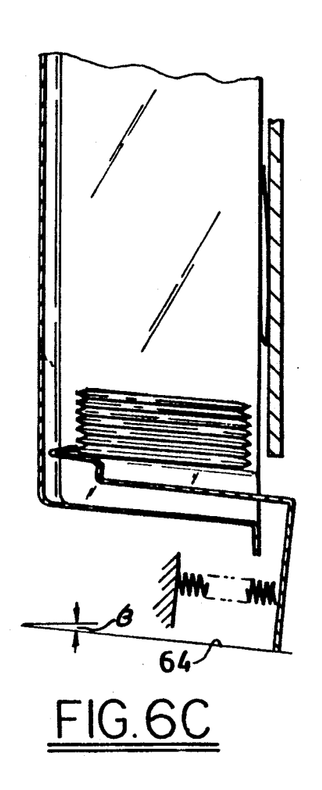
FIG. 6C is a view similar to FIGS. 6A and 6B illustrating the dispensing member in the engaging position wherein the bottom packet is captured by the dispensing member and is ready for removal from the tray.

Referring to FIGS. 6A-6C, there is illustrated the relative position of the clip 86 as it moves from the dispensing position illustrated in FIG. 6A to the film packet engaging position illustrated in FIG. 6C. In the preferred embodiment illustrated, the spring 98 biases the dispensing member 84 such that the clip 86 is normally positioned in the dispensing position. When it is desired to remove a packet, the operator pushes on the gripping section 84 of the stripper member so as to cause the clip 86 to move through the access opening 34, as shown in FIG. 6B, and back into rear space 42 as shown in FIG. 6C where it engages the bottom packet. The operator then allows the spring, if present, to move the stripper member to the dispensing position. If no spring is present, the operator simply pulls the gripping section 94 in the opposite direction. The forward section 58 of the dispenser is designed such that the packet being dispensed will be in the position as illustrated in FIG. 2. The side wall 81 of forward dispensing section 58 is located such that a sufficient amount of the packet will extend out of the opening 99 adjacent side wall 81 so as to allow easy access to the packet. Preferably the side wall 81 of forward dispensing section is located at about the mid-center line 111 of the tray 12 or above the mid-center line 111 as viewed in FIG. 2.

The packet may be removed by hand or optionally, the clip 86 can be designed such that when a packet is in the dispensing position it will easily fall off the clip 86. In order to accomplish this, the cross-sectional area of the surface 87 of the clip 86 is designed such that when the gripping section 94 of the dispensing member 84 is pulled outwardly in a quick manner, the jarring force of the gripping member reaching the dispensing position will cause the packet to fall from the clip 86 into a cup or other container positioned underneath by the user. Applicants have found that by properly designing the shape and size of clip 86 and opening 99 only a small amount of jarring is required to cause the packet to fall off the clip 86.

In order to assist the movement of the clip 86 and retaining finger 88 beneath the bottom packet, the clip 86 is designed such that it will have an interference travel as it moves to the engaging position. As previously discussed, the bottom wall 64 of the base 50 is disposed at an angle $\beta$ of approximately 6° with respect to a plane substantially perpendicular to the bottom surface of the tray 12. This will cause the clip 86 to move at a 6° angle as it is moved from the dispensing position to the engaging position. The lower end wall of the tray 12, as previously discussed, is disposed at an angle $\alpha$ of approximately 5° with respect to the bottom wall. Thus, there is an approximate 1° interference between the movement of the clip 86 as it moves to its engaging position. This interference movement assists the retaining finger in properly seating behind the bottom packet by generating a spring force in the arm 92 as it travels to the engaging position. This spring force is applied to the bottom of the packet to ensure that the clip and retaining finger properly engages the bottom packet.

Alternatively, the tray 12 may be place in a drawer or other confined area where the packets 14 can be removed individually by hand. The peelable cover 31 is at least partially removed and the bottom wall 16 of the tray place on a supporting surface. A first packet can be removed by placing the finger within the access opening 34 and pulling out a first packet. The remaining packets are removed in like manner. When the tray 12 is used in this manner, the ribs 40 may be eliminated. However, by providing ribs 40, the ribs 40 assist in removing a packet when it is lying flat on the bottom wall 16 by allowing the finger of the user to reach beneath the packet.

Figure 9:
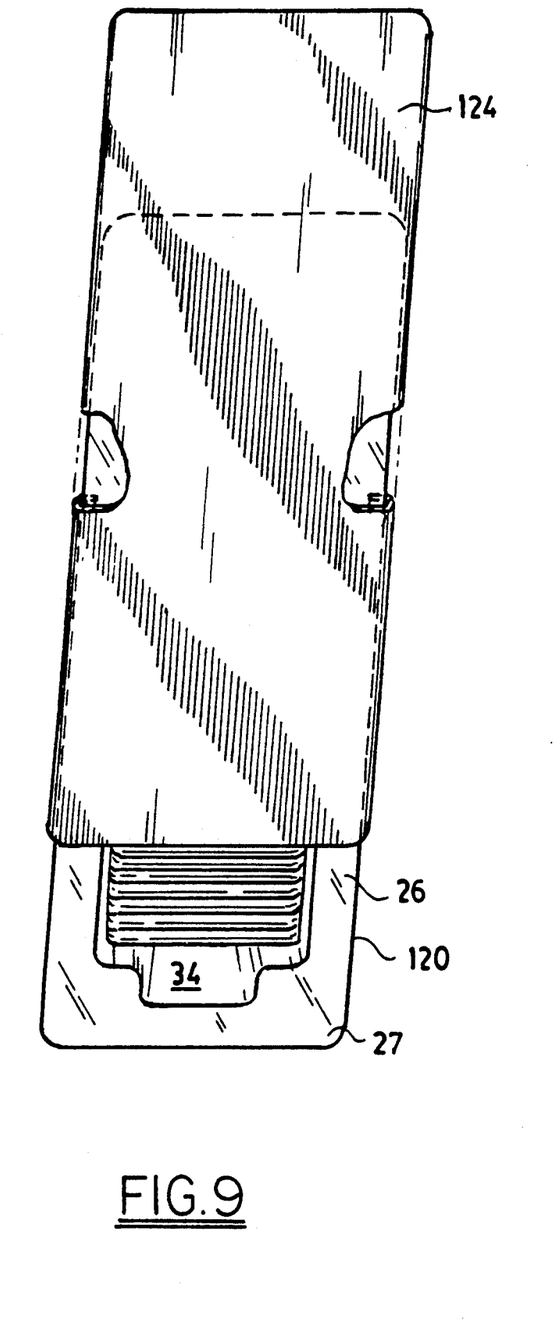
FIG. 9 is a perspective view of a modified tray made in accordance with the present invention.

Referring to FIG. 9, there is illustrated a modified tray 120 made in accordance with the present invention. Tray 120 is similar to tray 12, like numerals indicating like parts. In this embodiment a slideable cover 124 is provided which is designed to engage rim 26. In the particular embodiment illustrated, the sides of the cover 124 is simply folded over so as to capture the rim 26 as shown by the broken away sections. The slideable cover 124 is opened as closed as required by the user. When the tray 120 is placed in dispenser 10, the cover 124 is simply slide an appropriate distance to allow the bottom packets to be exposed. If the tray 120 is placed in a drawer and the packets removed directly therefrom, the cover 124 is simply slide open the required distance so that the desired number of packets can be removed. The cover 124 can then be closed so as to maintain the cleanliness of the packets.

It is to be understood that various changes and modifications may be made to the present invention without departing from the scope of the present invention. For example, but not by way of limitation, various other replaceable covers may be provided on tray 12. Additionally, the access opening 34 for allowing access to the rear space is not limited to placement in the bottom wall. It may for example be located in one of the side walls. The present invention is limited only by the following claims.

What is claimed is:

1. A tray for holding a stack of film packets and use with a dispenser for dispensing individual packets in seriatim from the tray, said tray comprising a bottom wall, a first end wall, a second end wall, and two substantially parallel side walls, said side and end walls extending upwardly from the bottom wall terminating in an upper rim to define an open top and a recess for receiving a stack of film packets, said second end wall having a support surface for supporting the stack of film packets when said tray is positioned in the substantially vertical position in the dispenser, said bottom wall having means for forming a rear space behind the bottom packet of said stack of film packets, and means for providing access to the rear space behind the bottom packet of the stack of film packets placed in said recess.

2. A tray according to claim 1 wherein said means for providing access to the rear space comprises an access opening provided in said second end wall.

3. A tray according to claim 2 wherein said support surface of said second end wall has a pair of projections, one of said projections being disposed on each side of said access opening, said second end wall and adjacent said walls having a radium therebetween such that the side edges of the packets are not restricted in their movement out of the tray.

4. A tray according to claim 2 wherein the access opening in said second end wall and said rear space have a configuration so as to allow a dispensing member to be placed behind the bottom packet of the stack of film packets placed in the recess.

5. A tray according to claim 1 wherein said bottom wall has means for spacing said stack of film packets a predetermined distance from the surface of said bottom wall and forming said rear space behind said bottom packet.

6. A tray according to claim 5 wherein said means for spacing said stack of film packets from said bottom wall and forming the rear space behind said bottom packet comprises a pair of spaced ribs which extend from the bottom wall, said ribs being spaced apart such that the rear space is in communication with said access opening in said bottom wall.

7. A tray according to claim 1 wherein said support surface of said second end wall has a configuration such that the sides of the packet adjacent said support surface are not restricted in their movement.

8. A tray according to claim 1 wherein said tray is thermo-formed.

9. A tray for holding and dispensing individual packets from a stack of film packets, said tray comprising a bottom wall, a first end wall, a second end wall, and two substantially parallel side walls, said side and end walls extending upwardly from the bottom wall terminating in an upper rim to define an open top and a recess for receiving a stack of film packets, said second end wall having an access opening extending from said open top along said second end wall towards said bottom wall for allowing access to the packets disposed in said recess, and a cover for placement over said rim and fully enclosing said recess.

10. A tray according to claim 9 wherein said cover is peelably secured to the rim.

11. A tray according to claim 9 wherein said cover is slidably mounted to said tray.

12. A tray according to claim 9 wherein the bottom wall has means for spacing the packets above the bottom wall and forming a rear space behind the packets.

13. A tray according to claim 9 wherein said tray is made of a plastic material.

14. In a tray containing a stack of film packets, said tray comprising a bottom wall, a first end wall, a second end wall, and two substantially parallel side walls, said side and end walls extending upwardly from the bottom wall terminating in an upper rim to define an open top and a recess for receiving the stack of film packets, said second end wall having an access opening extending from said open top along said second end wall towards said bottom wall for allowing access to the packets disposed placed in said recess, a cover placed over said rim for fully covering said recess and packets therein.

15. In a tray according to claim 14 wherein said cover is peelably secured to the rim.

16. In a tray according to claim 14 wherein said cover is slidably mounted to said tray.

17. In a tray according to claim 14 wherein the bottom wall has means for spacing the packets above the bottom wall and forming a rear space behind the packets.

18. A tray according to claim 14 wherein said tray is made of a plastic material.

19. A tray for holding and dispensing individual packets from a stack of film packets, said tray comprising a bottom wall, a first end wall, a second end wall, and two substantially parallel side walls, said side and end walls extending upwardly from the bottom wall terminating in an upper rim to define an open top and a recess for receiving a stack of film packets, said second end wall having an access opening extending from said open top along said second end wall towards said bottom wall for allowing access to the packets disposed in said recess.

20. A tray according to claim 19 wherein the bottom wall has means for spacing the packets above the bottom wall and forming a rear space behind the packets.

21. A tray according to claim 19 wherein said tray is made of a plastic material.

22. A tray and a contained stack of film packets, said tray comprising a bottom wall, a first end wall, a second end wall, and two substantially parallel side walls, said side and end walls extending upwardly from the bottom wall terminating in an upper rim to define an open top and a recess for receiving the stack of film packets, said second end wall having an access opening extending from said open top along said second end wall towards said bottom wall for allowing access to the packets disposed placed in said recess, a cover placed over said rim for fully covering said recess and packets therein.

23. A tray according to claim 22 wherein said cover is peelably secured to the rim.

24. A tray according to claim 22 wherein said cover is slidably mounted to said tray.

25. A tray according to claim 22 wherein the bottom wall has means for spacing the packets above the bottom wall and forming a rear space behind the packets.

26. A tray according to claim 22 wherein said tray is made of a plastic material.

* * * * *